(12) United States Patent
Park

(10) Patent No.: US 8,083,168 B2
(45) Date of Patent: Dec. 27, 2011

(54) COLLAPSIBLE KITCHEN TOOL

(75) Inventor: Caroline Park, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 0 days.

(21) Appl. No.: 12/646,824

(22) Filed: Dec. 23, 2009

(65) Prior Publication Data

US 2010/0163659 A1    Jul. 1, 2010

Related U.S. Application Data

(60) Provisional application No. 61/141,998, filed on Dec. 31, 2008.

(51) Int. Cl.
*A47J 43/00* (2006.01)
(52) U.S. Cl. .................................................. 241/169.2
(58) Field of Classification Search .................. 241/168, 241/169.2; 403/160
See application file for complete search history.

(56) References Cited

U.S. PATENT DOCUMENTS

| | | | | |
|---|---|---|---|---|
| 33,654 | A | * | 11/1861 | Lorton ........................ 241/169.2 |
| 171,603 | A | * | 12/1875 | Crane, Jr. .................... 241/169.2 |
| 1,155,915 | A | | 10/1915 | Grove |
| 1,880,098 | A | * | 9/1932 | Mair ............................. 285/184 |
| D255,636 | S | | 7/1980 | Kelly |
| 4,759,240 | A | * | 7/1988 | Lin ............................... 81/177.8 |
| D304,894 | S | | 12/1989 | Carlson |
| 5,815,875 | A | * | 10/1998 | Yamada ....................... 15/167.1 |
| D443,185 | S | | 6/2001 | Kaposi |
| 7,434,496 | B2 | * | 10/2008 | Hu ................................ 81/177.7 |
| 2009/0193981 | A1 | * | 8/2009 | Webb .............................. 99/508 |

* cited by examiner

*Primary Examiner* — Faye Francis
(74) *Attorney, Agent, or Firm* — Lowe Graham Jones PLLC

(57) ABSTRACT

A tool handle is secured to a tool head in a manner that allows the tool head such as a potato masher to be collapsed or folded with respect to the handle for more compact storage. In one form, the tool head is connected to the handle via a ball joint allowing for rotational and pivotal movement.

14 Claims, 4 Drawing Sheets

COLLAPSIBLE KITCHEN TOOL

PRIORITY CLAIM

This application claims the benefit of prior provisional application 61/141,998, filed Dec. 31, 2008, which is hereby incorporated by reference.

FIELD OF THE INVENTION

This invention relates generally to kitchen tools, particularly including kitchen tools that can be collapsed or folded for storage.

BACKGROUND OF THE INVENTION

Some kitchen tools such as potato mashers have a large working tool head connected to a relatively thin handle. While the handle size is convenient for storage, the tool head is often large and unwieldy. When several such tools are to be stored together, they can become interconnected or get in the way of one another, making both storage and retrieval difficult. Likewise, the tool can be difficult to wash in a dishwasher and may not fit in relatively flat spaces.

SUMMARY OF THE INVENTION

In a preferred version, the present invention includes a tool handle secured to a tool head. The tool head is secured to the handle in a manner that allows the tool head to be collapsed or folded with respect to the handle for more compact storage. In one form, the tool head is connected to the handle via a ball and socket joint allowing for rotational and pivotal movement. Most preferably the axis of rotation of the handle with respect to the tool head is at about 45 degrees with respect to a common central axis extending through the handle and tool head.

In some versions of the invention, the handle secures to a stem extending from the tool head, with the handle and stem each terminating in a surface having a complementary 45 degree angle. When the two surfaces are adjacent one another in use, the handle extends orthogonally away from the tool head. As desired, the handle may be rotated along the common surfaces so that the handle lies in a plane that is substantially parallel to that of the tool head.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
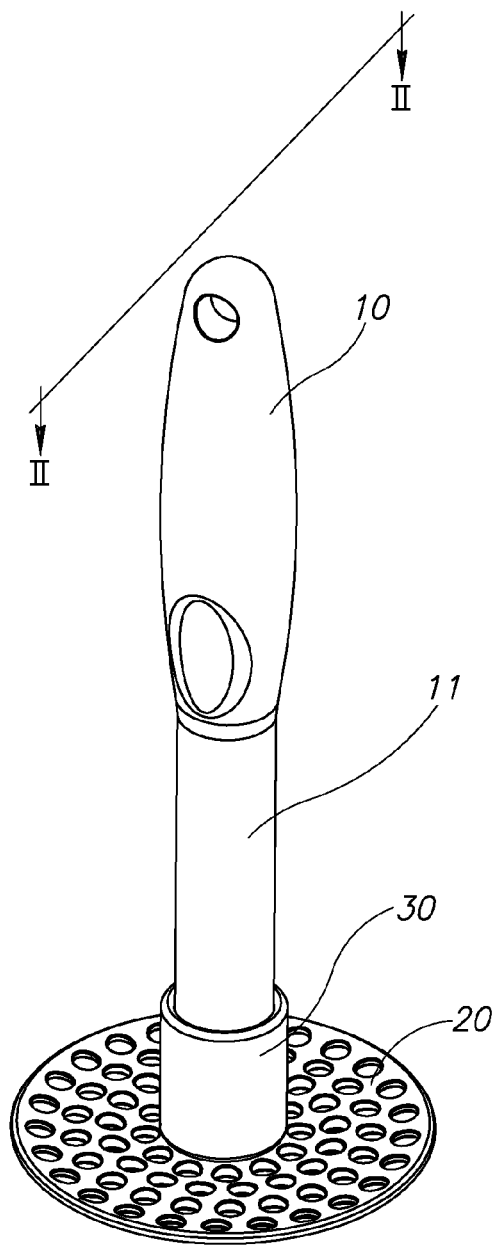
FIG. 1 is a perspective view of a preferred collapsible kitchen tool, shown with a handle in a first position with respect to a tool head.
Figure 2:
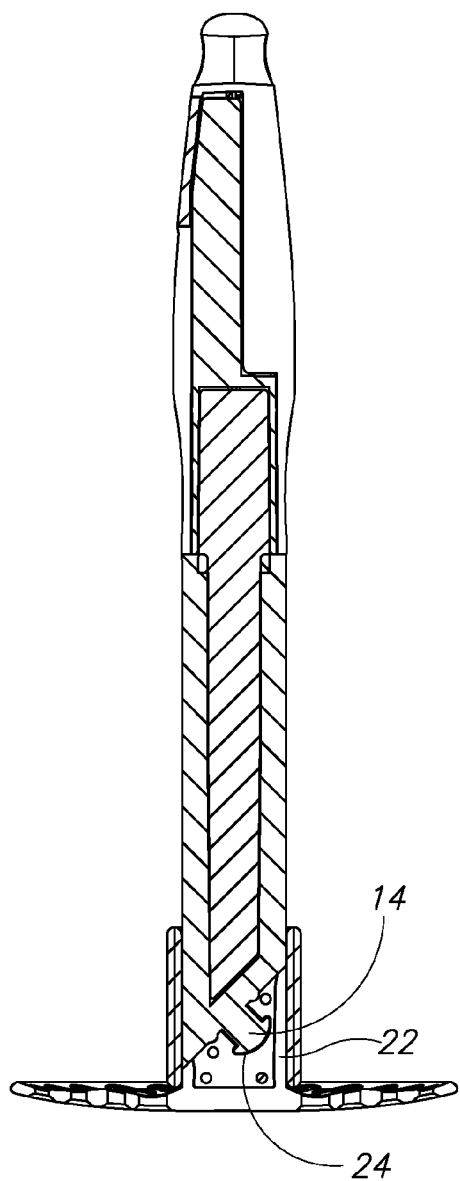
FIG. 2 is a sectional view of a preferred collapsible kitchen tool, taken along line II-II of FIG. 1.
Figure 3:
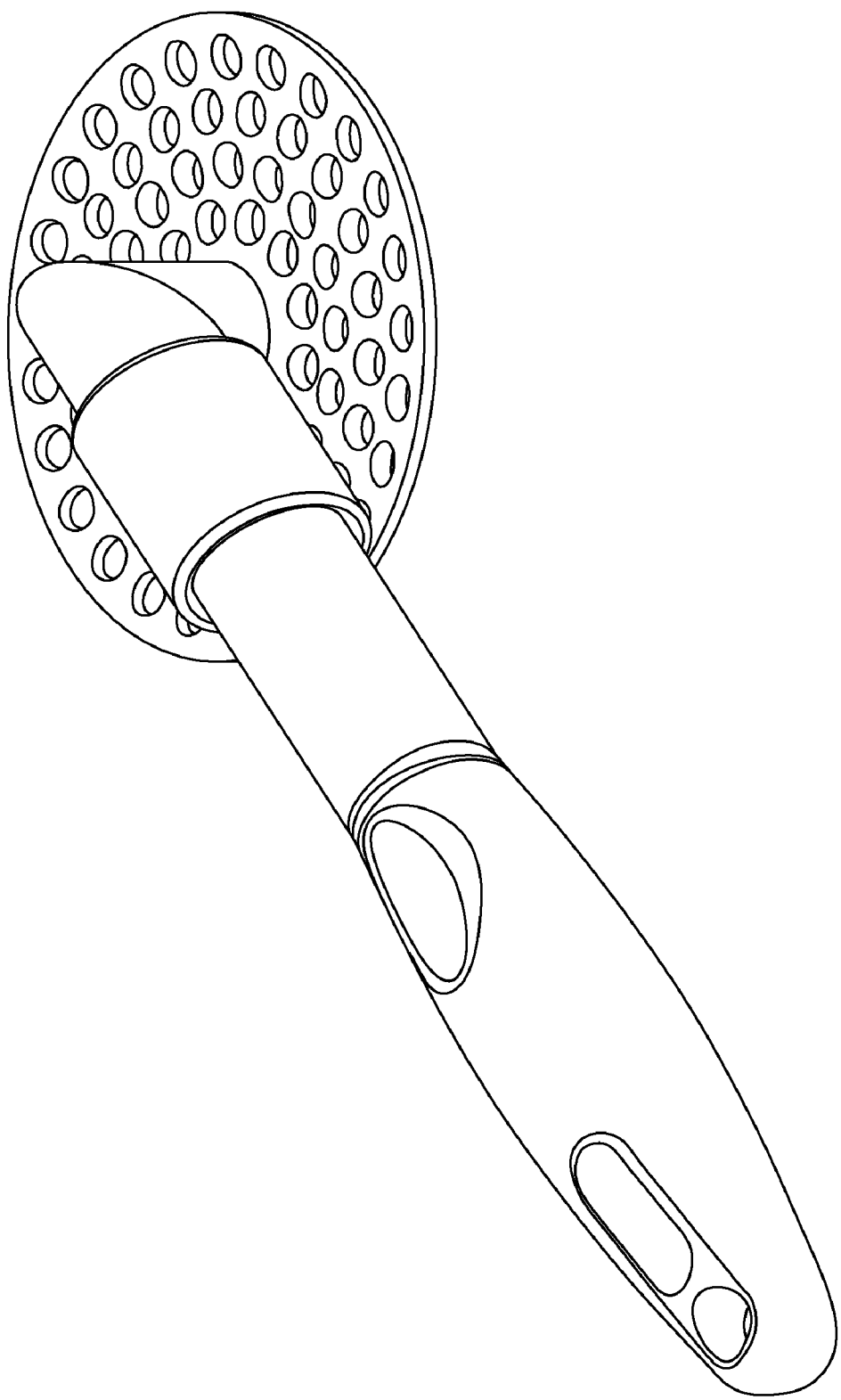
FIG. 3 is a perspective view of the tool of FIG. 1, shown with the handle rotated to a second position with respect to the tool head.
Figure 4:
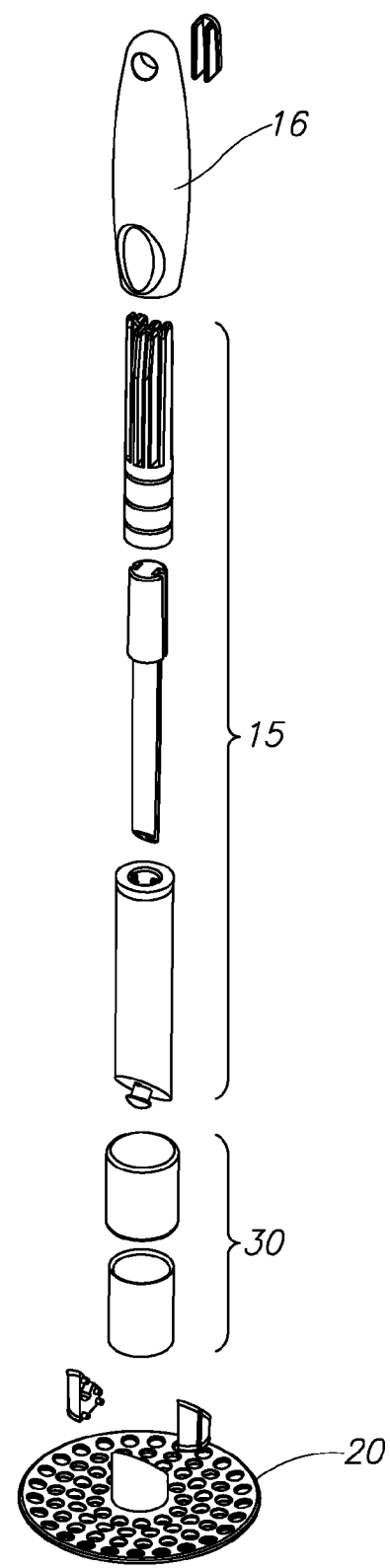
FIG. 4 is an exploded view of a preferred collapsible kitchen tool.
Figure 5:
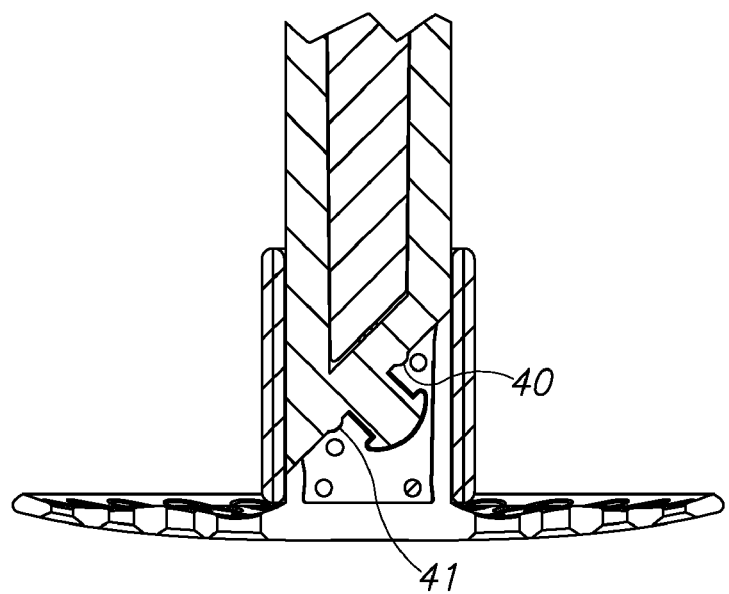
FIG. 5 is a close-up of the exploded view of FIG. 2, showing the tool head and handle connection.
Figure 6:
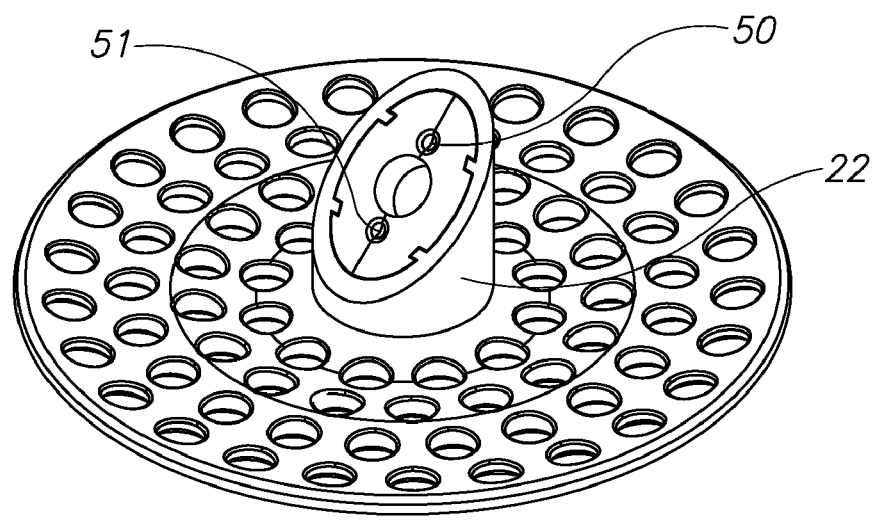
FIG. 6 is a perspective view of a preferred tool head.

An exemplary collapsible kitchen tool is shown in the drawings and described below. In the version as illustrated, the tool is in the form of a potato masher in which the tool head has a plurality of holes through which mashed potato may pass. The tool head may have other configurations, however, and the invention is best suited for use with tool heads having a cross-sectional size and shape that is much larger than that of the handle.

The tool as illustrated includes a handle having a distal handle end 10 for grasping by a user and a proximal end 11 that is configured to be secured to a tool head 20. The proximal end preferably has a substantially smooth cylindrical shape, though in other versions of the invention the handle may be ribbed, rectangular, or otherwise configured. The handle may be formed as a single integral piece of material, or may have several components 15 fitting together and terminating with an ergonomic grip 16.

A collar 30 is attached to the proximal end of the handle. The collar fits snugly around the handle and is secured for sliding movement axially along the handle. As will be discussed further below, the collar locks the tool head and handle in a first position configured for use and, when the collar is moved, allows the tool head to be collapsed with respect to the handle for more compact storage.

In one version the handle and tool head are formed primarily from plastic materials such as Nylon, with a thermoplastic elastomer secured to the distal end of the handle to provide a more secure and ergonomic grip. In other versions, the handle and tool head may be constructed from stainless steel, wood, alternative plastics, or other materials.

The handle terminates at its proximal end in a surface 12 forming an approximate 45 degree angle with respect to an axis extending along the length of the handle. The proximal end of the handle further includes a detent or ball 14 projecting away from the proximal end substantially at the same 45 degree angle. The ball 14 at the end of the handle is configured to mate with a corresponding socket 24 in the tool head. The ball and socket arrangement allows the handle to be secured to the tool head for rotation along the complementary 45 degree angled faces.

The tool head 20 includes a working portion which, as shown, is in the form of a slightly curved circular plate having a plurality of holes. At a central location within the circular plate a stem 22 extends axially upward. Though the stem extends axially away and is centrally located as shown, in other embodiments and with different tool heads the stem may be located in a different position. For that matter, it is not essential to the invention that a stem is included at all. Thus, in different examples of the invention alternative structures are used to interconnect the handle and the tool head.

The stem terminates in an angled surface that is complementary to the angle formed in the proximal end of the handle. Thus, in the example as shown, the stem includes a terminal surface 12 formed at a 45 degree angle. In addition, the terminal end of the stem includes a socket 24 that is sized and configured to receive the ball 14 provided in the handle. Preferably, the ball and socket are formed to enable the ball to be snap-fit into the socket such that the ball may be removed but a substantial force is required to do so. In alternate examples of the invention, the ball and socket arrangement may be reversed, such that the ball is formed in the stem and the socket formed in the handle.

In other versions of the invention the angles used in the collar and the stem need not be complementary or the same as one another. Depending on the size and shape of the tool head, different combinations of angles may either be desired or sufficient.

In a preferred form, the surface 12 at the terminal end of the handle includes one or more projections 40, 41 that are received within corresponding depressions 50, 51 within the angled surface 22 of the stem. The projections may be large enough to lock the stem and handle in place with respect to one other or, in the preferred version, simply provide a tactile feedback so that the user knows that the handle has been rotated into a vertical position with respect to the tool head. Because the collar locks the handle in place, there is no need for a locking function in the projections 40, 41. In some versions, however, the collar may be eliminated and replaced with projections that are sufficiently large to hold the stem and handle in position through the forces likely to be experienced in use. In alternate versions, a pin or other locking mechanism may replace the collar. Likewise, the projections and corresponding valleys may be provided on either of the stem or handle, or some combination of both.

When configured for use, the handle is attached to the tool head with the ball and socket engaged as shown. The angled faces of the handle and stem are aligned with one another such that the handle extends away from the tool head along a common axis defined by the stem, the handle, and the center of the tool head. As shown in the illustrations, the axis lies along the sectional line A-A provided below. Although the handle and tool head may freely rotate with respect to one another by virtue of the ball and socket connection, the collar 30, coupled with the angled faces of the handle and stem, prevent rotation of the two pieces while the collar is in place.

In order to collapse the tool for storage, the collar is moved axially away from the tool head along the proximal end of the handle in a direction toward the distal end. The collar should be moved so that it is beyond the farthest surface of the stem. The movement of the collar to expose the adjacent angled surfaces of the stem and handle will allow the stem and handle to freely rotate with respect to one another about an axis defined by the ball and socket joint. Thus, the handle is rotated with respect to the stem until the handle is in a desired position for storage. Most preferably, the handle is rotated until the main axis defined by the handle is at an angle of about 90 degrees with respect to the central axis defined by the stem. In this position the tool head is in a better position to fit within a drawer or to be placed adjacent other similar tools for storage, or to be placed in a dishwasher in which a relatively flat space is available.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A collapsible kitchen tool, comprising:
   a tool head having a stem projecting away from the tool head, the stem having a stem central axis, the stem further terminating in a first surface at a distal end of the stem, the first surface defining a first plane; and
   a handle having a distal end and a proximal end and defining a handle central axis between the distal end and the proximal end, the stem being secured to the handle for pivotal movement of the stem with respect to the handle, the proximal end of the handle terminating in a second surface defining a second plane;
   whereby the handle is pivotally moveable between a first position in which the stem central axis and the handle central axis are substantially parallel, and a second position in which the stem central axis and the handle central axis substantially perpendicular to one another, the first surface and the second surface being parallel with one another in the first position and the second position; and
   a collar surrounding the proximal end of the handle and positioned for axial sliding movement along the handle, the collar being sized to surround the first surface and the second surface when the handle is in the first position.

2. The collapsible kitchen tool of claim 1, wherein the handle is pivotally secured to the stem via a ball formed on one of the stem or the handle and a socket formed on the other of the stem or the handle, the ball being received within the socket to pivotally secure the handle to the stem.

3. The collapsible kitchen tool of claim 2, wherein the first plane is at approximately 45 degrees with respect to the stem central axis, and the second plane being is at approximately 45 degrees with respect to the handle central axis.

4. The collapsible kitchen tool of claim 3, wherein the first plane and the second plane are parallel to one another.

5. The collapsible kitchen tool of claim 4, wherein one of the first surface or the second surface further comprises at least one projection and the other of the first surface or the second surface comprises at least one corresponding depression, wherein the at least one projection is configured to be received within the at least one depression when the handle is in the first position.

6. A collapsible kitchen tool, comprising:
   a tool head having a stem projecting away from the tool head, the stem having a stem central axis and terminating in a first surface at a distal end of the stem, the first surface defining a first plane, the first plane being non-orthogonal with respect to the stem central axis; and
   a handle having a distal end and a proximal end and forming a handle central axis, the proximal end of the handle being connected to the stem for rotational movement of the handle with respect to the stem;
   whereby the handle is pivotally moveable between a first position in which the stem central axis and the handle central axis are substantially parallel, and a second position in which the stem central axis and the handle central axis are at an angle of greater than 45 degrees with respect to one another; and
   a collar attached to the proximal end of the handle and positioned for axial sliding movement along the central axis of the handle, the collar being sized to surround the first surface and the second surface when the handle is in the first position.

7. The collapsible kitchen tool of claim 6, wherein in the second position the stem central axis and the handle central axis are substantially orthogonal to one another.

8. The collapsible kitchen tool of claim 7, further comprising a ball formed on one of the stem or the handle and a socket formed on the other of the stem or the handle, the ball being received within the socket to pivotally secure the handle to the stem.

9. The collapsible kitchen tool of claim 8, wherein the proximal end of the handle comprises a second surface, the second surface defining a second plane, the first surface and the second surface being parallel to and closely adjacent one another when the handle is in the first position and in the second position.

10. The collapsible kitchen tool of claim 9, wherein the tool head is configured for use as a potato masher.

11. The collapsible kitchen tool of claim 9, wherein the tool head further comprises a perimeter extending radially outward from the stem central axis and a plurality of bores extending axially through the tool head.

12. The collapsible kitchen tool of claim 11, wherein one of the first surface or the second surface further comprises at least one projection and the other of the first surface or the second surface comprises at least one corresponding depression, wherein the at least one projection is configured to be received within the at least one depression when the handle is in the first position.

13. A collapsible kitchen tool, comprising:
   a tool head having a stem projecting away from the tool head, the stem having a stem central axis and terminating in a stem distal end; and
   a handle having a distal end and a proximal end defining a handle central axis between the distal end and the proximal end;
   the proximal end of the handle being connected to the stem distal end for movement of the handle with respect to the stem, whereby the handle is pivotally moveable between a first position in which the stem central axis and the handle central axis are substantially parallel, and a second position in which the stem central axis and the handle central axis substantially perpendicular to one another; and
   a collar surrounding both the proximal end of the handle and the stem distal end when the handle is in the first position, whereby the collar locks the handle in the first position, the collar being repositionable to unlock the handle for movement of the handle to the second position.

14. The collapsible kitchen tool of claim 13, further comprising a ball formed on one of the stem or the handle and a socket formed on the other of the stem or the handle, the ball being received within the socket to pivotally secure the handle to the stem.

* * * * *